United States Patent
Jin et al.

(10) Patent No.: US 8,908,127 B2
(45) Date of Patent: Dec. 9, 2014

(54) DISPLAY APPARATUS AND METHOD OF MANUFACTURING THE SAME

(71) Applicant: Samsung Display Co., Ltd., Yongin, Gyeonggi-Do (KR)

(72) Inventors: Youyoung Jin, Suwon-si (KR); Sungkyun Park, Seoul (KR); Hyung-Il Jeon, Incheon (KR); Ki-Hyun Cho, Suwon-si (KR); Seok-Joon Hong, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 62 days.

(21) Appl. No.: 13/886,604

(22) Filed: May 3, 2013

(65) Prior Publication Data

US 2014/0198283 A1 Jul. 17, 2014

(30) Foreign Application Priority Data

Jan. 11, 2013 (KR) ........................ 10-2013-0003441

(51) Int. Cl.
*G02F 1/136* (2006.01)
*G02F 1/1335* (2006.01)
*G02F 1/1362* (2006.01)

(52) U.S. Cl.
CPC ...... *G02F 1/133516* (2013.01); *G02F 1/13345* (2013.01); *G02F 1/136227* (2013.01)
USPC .................................. 349/91; 349/86; 349/89

(58) Field of Classification Search
USPC ................................................ 349/86, 89, 91
See application file for complete search history.

(56) References Cited

FOREIGN PATENT DOCUMENTS

| KR | 1020050067014 A | 6/2005 |
|---|---|---|
| KR | 1020060069066 A | 6/2006 |
| KR | 1020080090627 A | 10/2008 |
| KR | 1020110060479 A | 6/2011 |

*Primary Examiner* — Phu Vu
(74) *Attorney, Agent, or Firm* — Cantor Colburn LLP

(57) ABSTRACT

A display apparatus includes a backlight unit generating light and a display substrate displaying an image using the light. The display substrate includes a substrate, a first electrode, a light blocking layer, a thin film transistor, a second electrode, a liquid crystal and a color filter. The substrate includes a pixel area and a non-pixel area, the first electrode is in the pixel area, and the light blocking layer is in the non-pixel area to block the light. The thin film transistor is on the light blocking layer and electrically connected to the first electrode. The second electrode faces the first electrode, and a cavity is defined therebetween. The liquid crystal is in the cavity, the color filter is on the second electrode, and the color filter is closer to the backlight unit than the substrate.

20 Claims, 14 Drawing Sheets

DISPLAY APPARATUS AND METHOD OF MANUFACTURING THE SAME

This application claims priority to Korean Patent Application No. 10-2013-0003441, filed on Jan. 11, 2013, and all the benefits accruing therefrom under 35 U.S.C. §119, the contents of which are hereby incorporated by reference in its entirety.

BACKGROUND

1. Field

The invention relates to a display apparatus and a method of manufacturing the same. More particularly, the invention relates to a display apparatus having improved reliability with respect to external impacts applied thereto, and a method of manufacturing the display apparatus.

2. Description of the Related Art

In general, a liquid crystal display device includes a liquid crystal display panel and a backlight unit. The liquid crystal display panel includes two substrates facing each other, two electrodes respectively disposed on the two substrates, and a liquid crystal layer interposed between the two substrates. The liquid crystal layer controls a transmittance of light passing therethrough after the light is output from the backlight unit, and thus the liquid crystal display displays an image using the light passing through the liquid crystal layer of the liquid crystal display panel.

SUMMARY

The invention provides a display apparatus having improved reliability with respect to external impacts applied thereto.

The invention provides a method of manufacturing the display apparatus.

One or more exemplary embodiments of the invention provides a display apparatus including a backlight unit generating light, and a display substrate displaying an image using the light.

The display substrate includes a substrate, a first electrode, a light blocking layer, a thin film transistor, a second electrode, a liquid crystal and a color filter. The substrate includes a pixel area and a non-pixel area, the first electrode is in the pixel area, and the light blocking layer is in the non-pixel area to block the light.

The thin film transistor is on the light blocking layer and electrically connected to the first electrode. The second electrode faces the first electrode, and a cavity is defined therebetween. The liquid crystal is provided in the cavity, the color filter is on the second electrode, and the color filter is disposed closer to the backlight unit than the substrate.

One or more exemplary embodiment of the invention provides a method of manufacturing a display apparatus. In the method, a substrate including a pixel area and a non-pixel area is prepared, a first electrode is provided in the pixel area, a light blocking layer is disposed in the non-pixel area, and a thin film transistor is disposed on the light blocking layer and electrically connected to the first electrode. A sacrificial layer is disposed on the first electrode, a second electrode is disposed on the sacrificial layer, and a color filter is disposed on the second electrode. The sacrificial layer is removed to define a cavity between the first electrode and the second electrode, and a liquid crystal is provided in the cavity.

The liquid crystal is sealed in the cavity using a sealing layer to manufacture a display substrate of the display apparatus. A backlight unit that generates a light is disposed to closer to the color filter of the display substrate than the substrate of the display substrate.

According to one or more exemplary embodiment of the invention, the one substrate of the display apparatus is exposed to the outside of the display substrate and/or the display apparatus. Thus, although the display substrate includes only one substrate, impact resistance of the display substrate is improved by the strength of the only one substrate, thereby improving reliability of the display substrate and the display apparatus.

In addition, since the color filter of the display substrate covers the liquid crystal provided in the cavity, the structure of the liquid crystal provided in the cavity may be stably maintained by the color filter. Therefore, a separate organic layer used to maintain the structure of the liquid crystal provided in the cavity may be omitted from the display substrate.

Further, when the light blocking layer includes the metal material and the thin film transistor is on the light blocking layer, physical and/or chemical change to the light blocking layer may be reduced or effectively prevented in a method of manufacturing the display substrate even though the light blocking layer is exposed to a process performed at a high temperature. Thus, the thin film transistor may be easily provided using a high temperature process.

BRIEF DESCRIPTION OF THE DRAWINGS

The above and other advantages of the invention will become readily apparent by reference to the following detailed description when considered in conjunction with the accompanying drawings in which:

FIGS. 5A to 9A and 5B to 9B are cross-sectional views showing an exemplary embodiment of a manufacturing method of a display substrate of a display apparatus, according to the invention.

DETAILED DESCRIPTION

Figure 1:
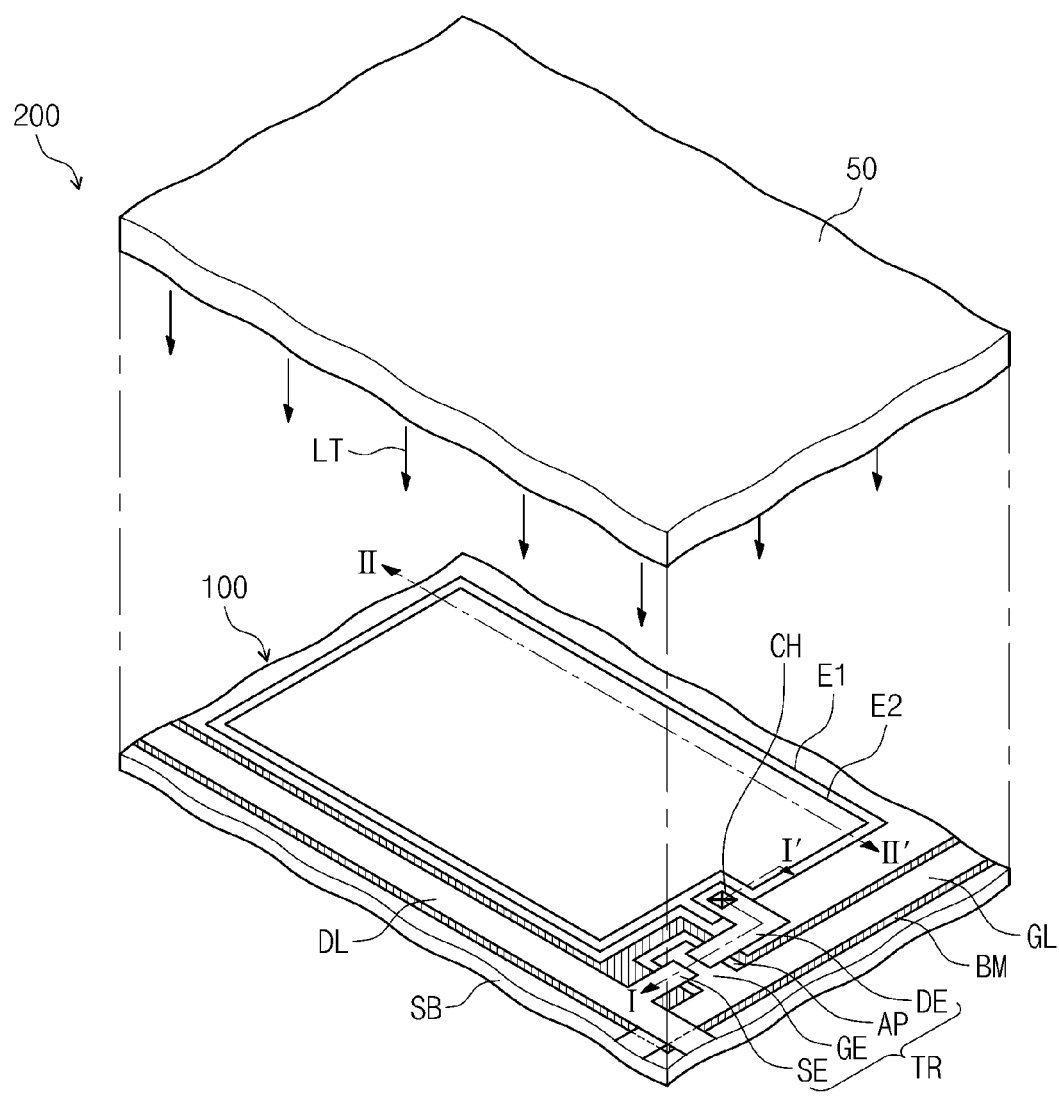
FIG. 1 is a plan view showing an exemplary embodiment of a display apparatus according to the invention.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In order to reduce a manufacturing cost of a liquid crystal display panel for a liquid crystal display device, a liquid crystal display panel in which the liquid crystal layer is built in only one substrate, has been developed. According to such a liquid crystal display panel, the total number of substrates for the liquid crystal display panel is reduced. In addition, since the liquid crystal layer is disposed in a predetermined region of the only one substrate, the manufacturing cost of the liquid crystal display panel is remarkably reduced.

Hereinafter, the invention will be explained in detail with reference to the accompanying drawings.

Figure 2A:
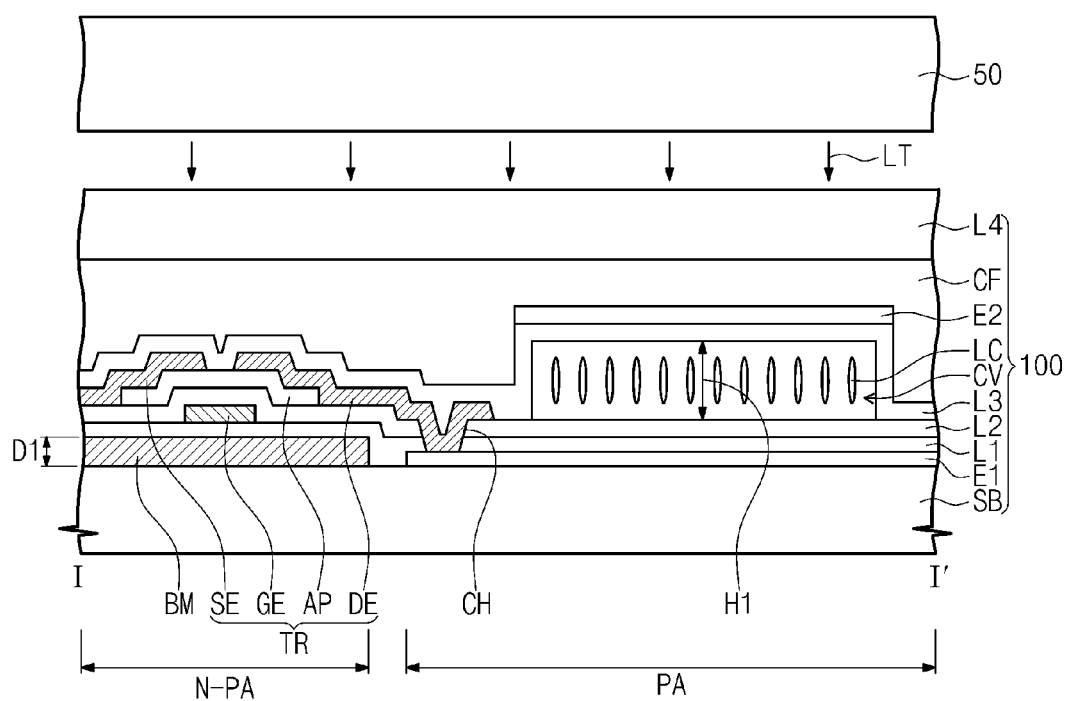
FIG. 2A is a cross-sectional view taken along line I-I' of FIG. 1.
Figure 2B:
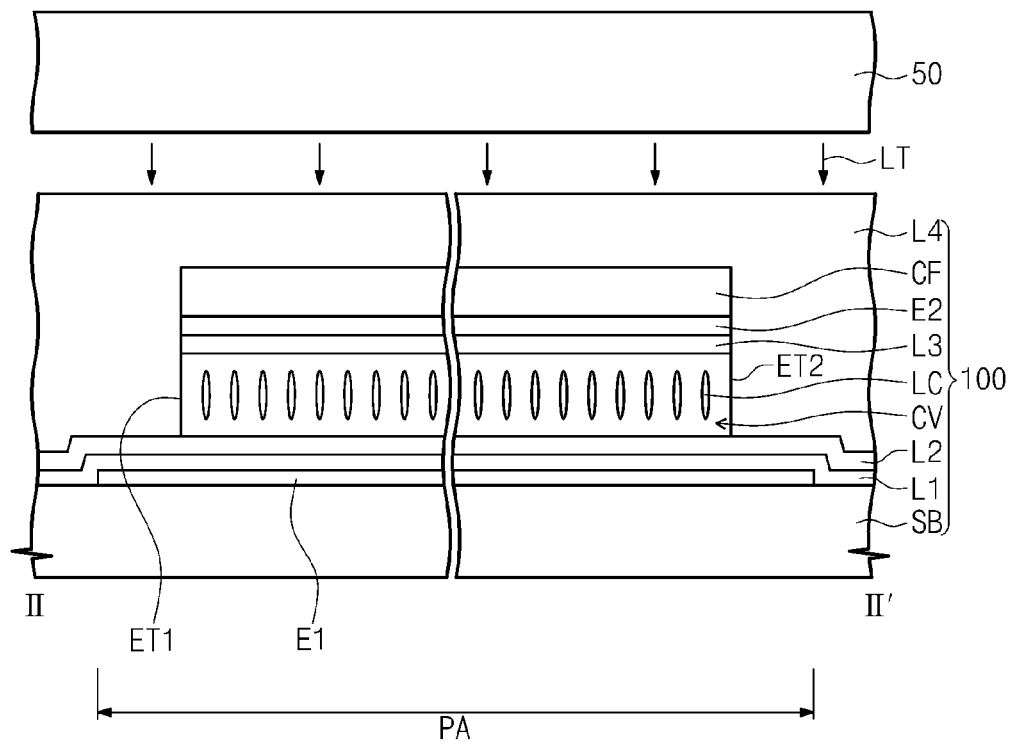
FIG. 2B is a cross-sectional view taken along line II-II' of FIG. 1.

FIG. 1 is a plan view showing an exemplary embodiment of a display apparatus according to the invention, FIG. 2A is a cross-sectional view taken along line I-I' of FIG. 1, and FIG. 2B is a cross-sectional view taken along line II-II' of FIG. 1.

Referring to FIGS. 1, 2A, and 2B, a display apparatus 200 includes a backlight unit 50 and a display substrate 100. The display apparatus 200 and/or the display substrate 100 may include a display area in which an image is displayed, and a non-display area in which an image is not displayed. The exemplary embodiment of the display apparatus 200 is shown as a liquid crystal display device.

The backlight unit 50 generates a light LT. The light LT is provided to the display substrate 100 and the display substrate 100 displays an image using the light LT. In the illustrated exemplary embodiment, the backlight unit 50 includes a light source (not shown), a light guide plate (not shown) that guides a light provided from the light source to the display substrate 100, and optical sheets (not shown) that condense and diffuse the light exiting from the light guide plate, but the structure of the backlight unit 50 should not be limited thereto or thereby. In an alternative exemplary embodiment, for instance, the light guide plate may be omitted from the backlight unit 50, and thus the backlight unit 50 may include point light sources, which are arranged spaced apart from each other at regular intervals in an area corresponding to the display area of the display substrate 100, instead of the light guide plate.

The display substrate 100 receives the light LT from the backlight unit 50 and displays the image. The display substrate 100 includes a plurality of pixels having substantially the same structure and function. Thus, only one pixel among the plurality of pixels is shown in FIG. 1 and described in detail as a representative example, and others is omitted.

The display substrate 100 includes a substrate SB which may otherwise be referred to as a base substrate, a gate line GL, a data line DL, a first electrode E1, a light blocking layer BM, a thin film transistor TR, a second electrode E2, a liquid crystal LC, and a color filter CF.

The substrate SB includes a pixel area PA and a non-pixel area N-PA and is a transparent insulating substrate. In one exemplary embodiment, for instance, the substrate SB is a transparent glass substrate or a transparent plastic substrate. When the substrate SB is the transparent plastic substrate, the substrate SB has flexibility. The pixel area PA and the non-pixel area N-PA may both be in the display area, but are not limited thereto or thereby. In the pixel area PA, light passes therethrough, whereas in the non-pixel area N-PA, light does not pass therethrough.

The first electrode E1 is disposed in the pixel area PA. The first electrode E1 includes a transparent conductive material, e.g., indium tin oxide, indium zinc oxide, etc. The first electrode E1 is electrically connected to the thin film transistor TR.

The light blocking layer BM is disposed in the non-pixel area N-PA to block the light LT. The light blocking layer BM includes a metal material, such as aluminum, chromium, etc., and has a cross-sectional thickness from tens of angstroms to thousands of angstroms. In one exemplary embodiment, a thickness of the light blocking layer BM is about 4000 angstroms.

The thin film transistor TR is disposed on the light blocking layer BM. A bottom insulating layer L1 is between the thin film transistor TR and the light blocking layer BM, and thus the light blocking layer BM is insulated from a gate electrode GE of the thin film transistor TR by the bottom insulating layer L1. The thin film transistor TR includes the gate electrode GE, an active pattern AP, a source electrode SE, and a drain electrode DE. The gate electrode GE is branched from and continuous with the gate line GL and receives a gate signal from the gate line GL. The active pattern AP includes a semiconductor material, such as amorphous silicon, and is disposed on the gate electrode GE while interposing a gate insulating layer L2 therebetween.

In addition, the source electrode SE and the drain electrode DE are disposed on the active pattern AP and spaced apart from each other. The source electrode SE is branched from and continuous with the data line DL and receives a data signal from the data line DL. The drain electrode DE makes contact with the first electrode E1 through a contact hole CH defined (e.g., formed) penetrating through cross-sectional thicknesses of the bottom insulating layer L1 and the gate insulating layer L2. Accordingly, when the gate signal is applied to the gate electrode GE and the thin film transistor TR is turned on, the data signal is applied to the first electrode E1 through the source electrode SE, the active pattern AP and the drain electrode DE.

An inter-insulating layer L3 is disposed on the thin film transistor TR to cover the thin film transistor TR. As shown in FIG. 2B, the inter-insulating layer L3 is disposed between the second electrode E2 and the liquid crystal LC. A first end portion of the inter-insulating layer L3 is located at a position corresponding to a first entrance ET1 of a cavity CV in which the liquid crystal LC is disposed when viewed in a plan view, and a second end portion of the inter-insulating layer L3 is located at a position corresponding to a second entrance ET2 of the cavity CV when viewed in the plan view. The structure of the inter-insulating layer L3 depends on a manufacturing method of the cavity CV, and thus this will be described later in more detail.

In the illustrated exemplary embodiment, the inter-insulating layer L3 includes an inorganic insulating material, e.g., silicon nitride, silicon oxide, etc.

The cavity CV is defined (e.g., formed) in the pixel area PA and the liquid crystal LC is provided inside the cavity CV. The cavity CV is defined by removing a sacrificial layer SL (refer to FIGS. 7A and 7B). The cavity CV is disposed under the second electrode E2 and the inter-insulating layer L3 and sealed by the inter-insulating layer L3 and a sealing layer L4. The cavity CV has a height H1 greater than a cross-sectional thickness D1 of the light blocking layer BM. In detail, when the thickness D1 of the light blocking layer BM is in a range from tens of angstroms to thousands of angstroms, the height H1 of the cavity CV may be in a range from about 1.8 micrometers to about 3.0 micrometers.

The second electrode E2 is disposed on the liquid crystal LC, and the inter-insulating layer L3 is between the second electrode E2 and the liquid crystal LC. In the illustrated exemplary embodiment, the second electrode E2 is disposed in the pixel electrode PA and not disposed in the non-pixel area N-PA, but should not be limited thereto or thereby. That is, the second electrode E2 may be disposed in both the pixel area PA and the non-pixel area N-PA according to an alternative exemplary embodiment.

Similar to the first electrode E1, the second electrode E2 includes a transparent conductive material, e.g., indium tin oxide, indium zinc oxide, etc. The second electrode E2 is electrically connected to a common voltage line (not shown) and receives a common voltage from the common voltage line. Therefore, an electric field is generated between the first and second electrodes E1 and E2, so that an arrangement of the liquid crystal LC disposed between the first electrode E1 and the second electrode E2 may be controlled.

In the illustrated exemplary embodiment, as shown in FIG. 2B, the first end portion of the inter-insulating layer L3 is located at the position corresponding to the first entrance ET1 of the cavity CV in which the liquid crystal LC is provided when viewed in the plan view, and the second end portion of the inter-insulating layer L3 is located at the position corresponding to the second entrance ET2 of the cavity CV when viewed in the plan view.

The color filter CF is disposed on the second electrode E2 to filter the light LT into a color light. As shown in FIG. 2B, a first end portion of the color filter CF is located at the position corresponding to the first entrance ET1 of the cavity CV when viewed in the plan view, and a second end portion of the color filter CF is located at the position corresponding to the second entrance ET2 of the cavity CV when viewed in a plan view.

The color filter CF may be further disposed on the thin film transistor TR as shown in FIG. 2A. Accordingly, the color filter CF may maintain the structure of the liquid crystal LC and various parts disposed on the substrate SB. The color filter CF may planarize underlying layers of the display substrate 100.

The color filter CF, the second electrode E2 and the inter-insulating layer L3 may expose the first and second entrances ET1 and ET2 of the cavity CV, such that the inside of the cavity CV is exposed. The sealing layer L4 surrounds the cavity CV in order to seal the liquid crystal LC in the cavity CV. In more detail, the sealing layer L4 is extended from the upper portion of the color filter CF to the first and second entrances ET1 and ET2 to seal the cavity CV. Thus, the sealing layer L4 may maintain the various parts disposed on the substrate SB in cooperation with the color filter CF. The sealing layer L4 may be an uppermost layer of the display substrate 100, but is not limited thereto or thereby.

In the display substrate 100 having the above-mentioned structure, the backlight unit 50 is disposed closer to the color filter CF than the substrate SB and the light LT sequentially passes through the color filter CF, the liquid crystal LC and the substrate SB in a direction toward the outside of the substrate SB, thereby displaying the image on the display substrate 100. An external impact may be applied from outside of the substrate SB, that is, the lower surface of the substrate SB in the view of FIGS. 2A and 2B. That is, the external impact is applied to the substrate SB and not to the sealing layer L4. Since the substrate SB of the display substrate 100 is exposed to the outside and not the sealing layer L4, impact resistance of the display substrate 100 may be improved by strength of the substrate SB as compared to when the sealing layer L4 is exposed to the outside.

Figure 3A:
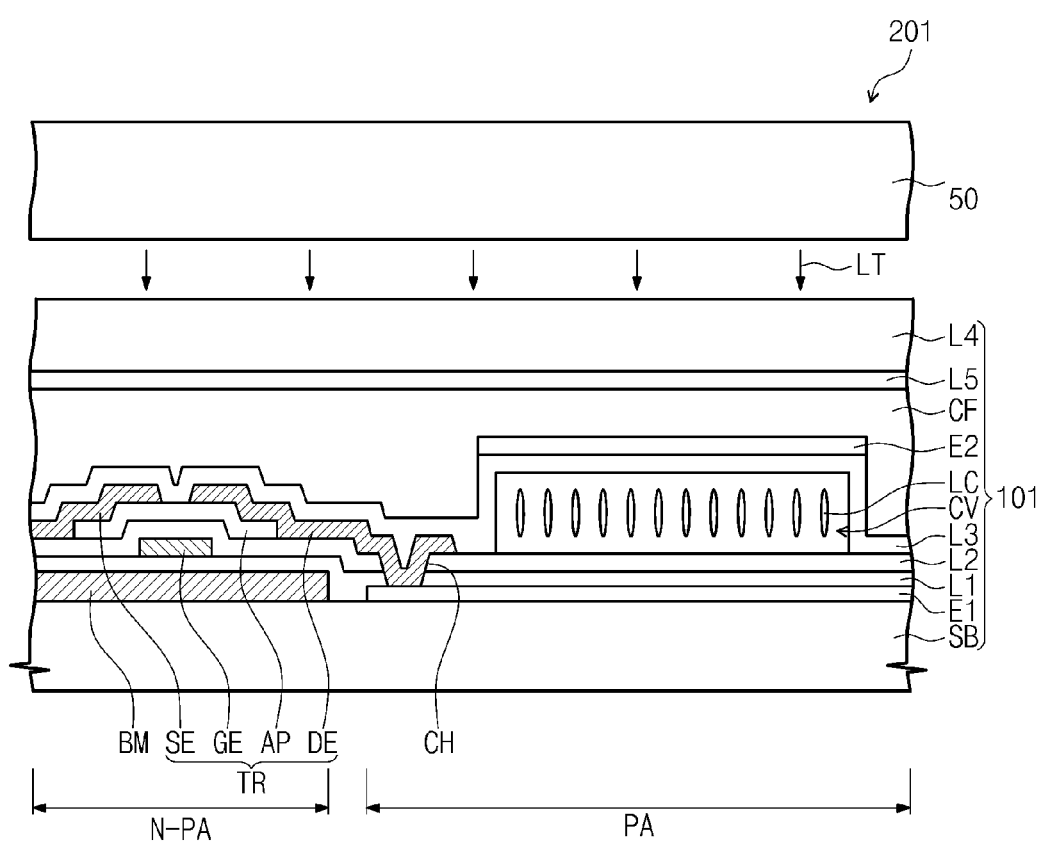
FIGS. 3A and 3B are cross-sectional views showing another exemplary embodiment of a display apparatus taken along line I-I' and along line II-II' of FIG. 1, respectively, according to the invention.
Figure 3B:
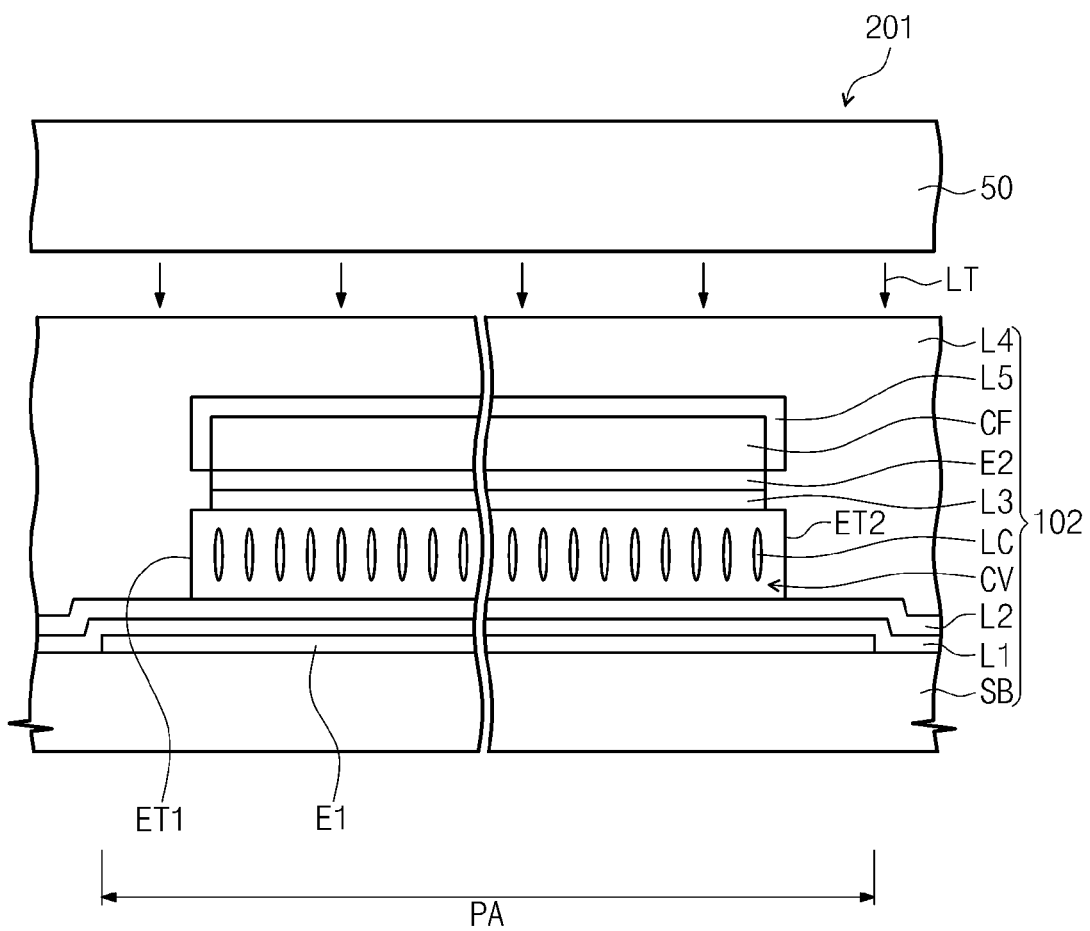

FIGS. 3A and 3B are cross-sectional views showing another exemplary embodiment of a display apparatus 201 according to the invention. In detail, the position of the cross-sectional view of the display apparatus 201 shown in FIG. 3A corresponds to the position of the cross-sectional view of the display apparatus 200 taken along line I-I' shown in FIG. 1 and the position of the cross-sectional view of the display apparatus 201 shown in FIG. 3B corresponds to the position of the cross-sectional view of the display apparatus 200 taken along line II-II' shown in FIG. 1. In FIGS. 3A and 3B, the same reference numerals denote the same elements in FIGS. 1, 2A, and 2B, and thus detailed descriptions of the same elements will be omitted.

Referring to FIGS. 3A and 3B, the display apparatus 201 includes a backlight unit 50 and a display panel 101. The display panel 101 of the display apparatus 201 further includes a roof insulating layer L5 as compared to the display apparatus 200 shown in FIGS. 1, 2A, and 2B. The roof insulating layer L5 includes an inorganic insulating material, such as silicon nitride, silicon oxide, etc.

The roof insulating layer L5 covers the color filter CF. In more detail, the roof insulating layer L5 covers an upper surface and both of opposing side surfaces (e.g., first and second end portions) of the color filter CF. Due to the roof insulating layer L5, in a method of manufacturing a display substrate, removal of the color filter CF with the sacrificial layer SL may be reduced or effectively prevented (refer to FIGS. 7A and 7B) when the cavity CV is formed by removing the sacrificial layer SL (refer to FIGS. 7A and 7B).

Figure 4A:
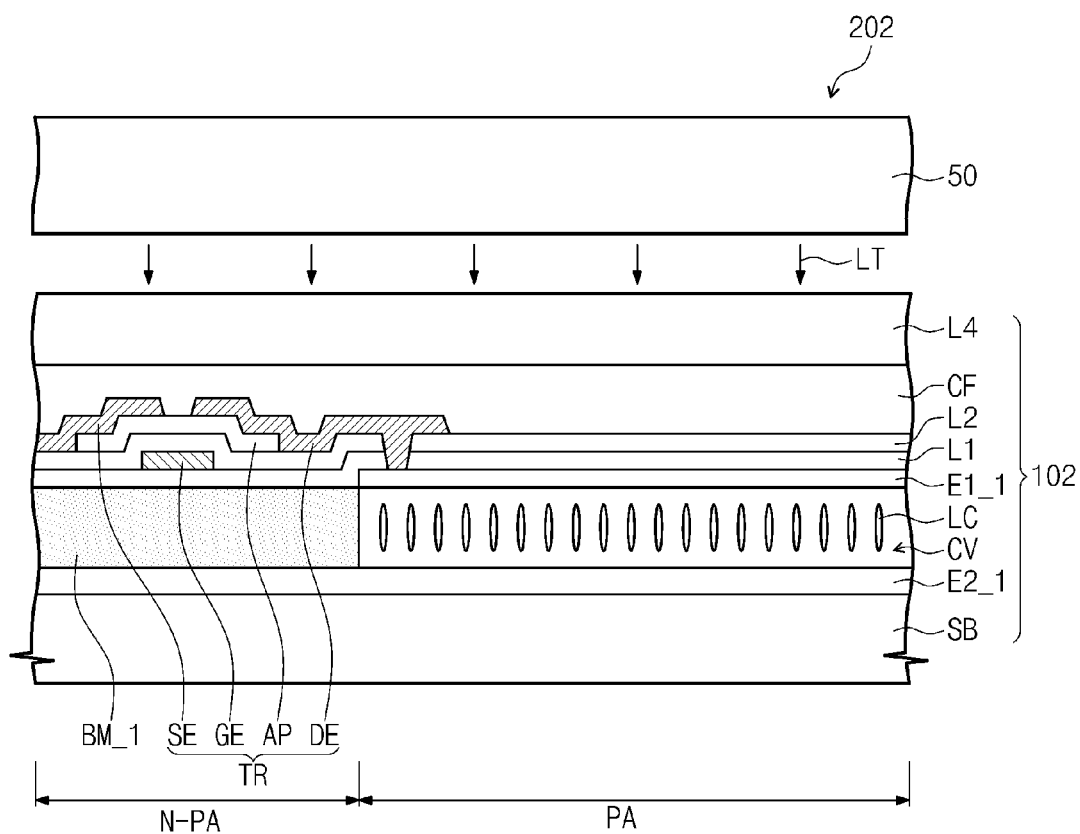
FIGS. 4A and 4B are cross-sectional views showing still another exemplary embodiment of a display apparatus taken along line I-I' and along line II-II' of FIG. 1, respectively, according to the invention.
Figure 4B:
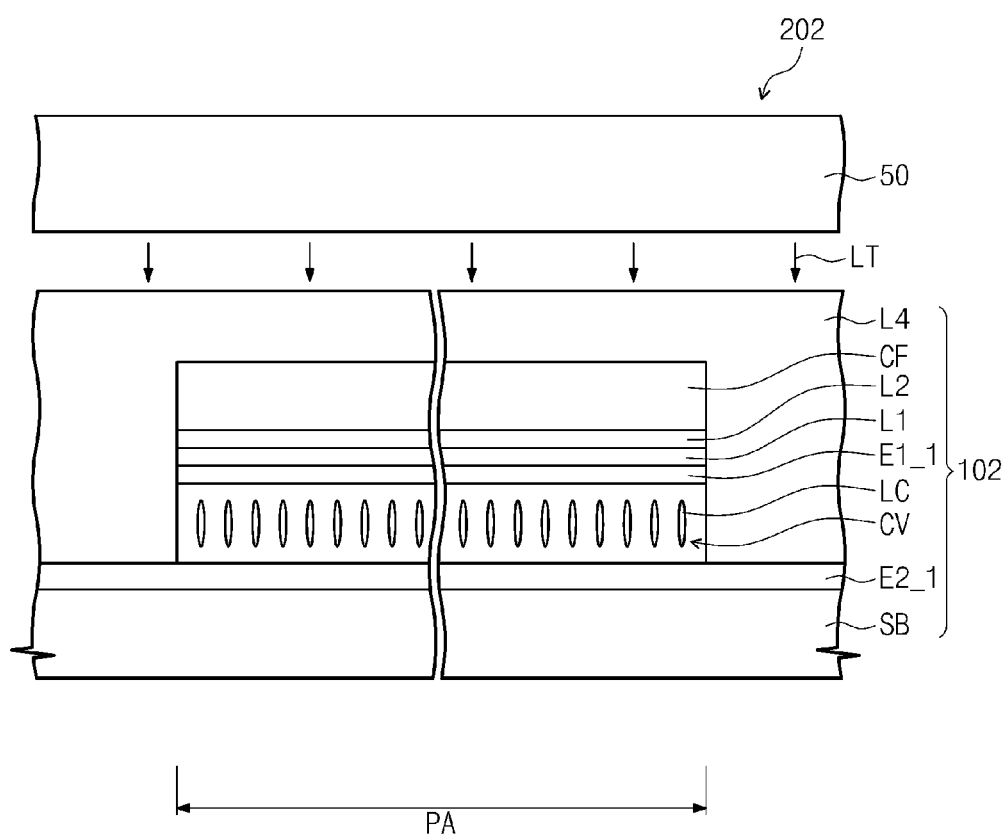

FIGS. 4A and 4B are cross-sectional views showing still another exemplary embodiment of a display apparatus according to the invention. In detail, the position of the cross-sectional view of the display apparatus 202 shown in FIG. 4A corresponds to the position of the cross-sectional view of the display apparatus 200 taken along line I-I' shown in FIG. 1 and the position of the cross-sectional view of the display apparatus 202 shown in FIG. 4B corresponds to the position of the cross-sectional view of the display apparatus 200 taken along line II-II' shown in FIG. 1. In FIGS. 4A and 4B, the same reference numerals denote the same elements in FIGS. 1, 2A, and 2B, and thus detailed descriptions of the same elements will be omitted.

Referring to FIGS. 4A and 4B, the display apparatus 202 includes a backlight unit 50 and a display panel 102, and the display panel 102 includes a light blocking layer BM_1, a first electrode E1_1, a thin film transistor TR, a second electrode E2_1, a liquid crystal LC and a color filter CF.

The light blocking layer BM_1 includes an organic insulating material and a difference between the cross-sectional thickness of the light blocking layer BM_1 and the height of the cavity CV is smaller than that of the display apparatus 200 described with reference to FIG. 2A. In one exemplary embodiment, for instance, the cross-sectional thickness of the light blocking layer BM_1 may be in a range from about 2 micrometers to about 4 micrometers and the height of the cavity CV may be in a range from about 1.8 micrometers to about 3 micrometers.

As described above, since the cross-sectional thickness of the light blocking layer BM_1 is substantially similar to the height of the cavity CV, the first electrode E1_1 is disposed between the color filter CF and the liquid crystal layer LC, and thus the thin film transistor TR disposed on the light blocking layer BM_1 may be easily physically and/or electrically connected to the first electrode E1_1.

In addition, to control the arrangement of the liquid crystal LC using the electric field generated between the first electrode E1_1 and the second electrode E2_1, the second electrode E2_1 may be disposed between the substrate SB and the liquid crystal LC, and the second electrode E2_1 may be located in the pixel area PA and in the non-pixel area N-PA.

In the illustrated exemplary embodiment, since the inter-insulating layer L3 (refer to FIG. 2A) that covers the thin film transistor TR is removed, the thin film transistor TR is covered by the color filter CF, but should not be limited thereto or thereby. That is, according to alternative exemplary embodiments, the inter-insulating layer L3 may be disposed between the color filter CF and the thin film transistor TR to cover the thin film transistor TR, and/or the display substrate 102 may further include the roof insulating layer L5 (refer to FIGS. 3A and 3B) as its element.

FIGS. 5A to 9A and 5B to 9B are cross-sectional views showing an exemplary embodiment of a manufacturing method of a display substrate according to the invention. In more detail, FIGS. 5A, 6A, 7A, 8A and 9A show the cross-sectional views taken along line I-I' of FIG. 1 and FIGS. 5B, 6B, 7B, 8B, and 9B show the cross-sectional views taken along line II-II' of FIG. 1. In FIGS. 5A to 9A and 5B to 9B, the same reference numerals denote the same elements in FIGS. 1 to 4B, and thus detailed descriptions of the same elements will be omitted.

Figure 5A:
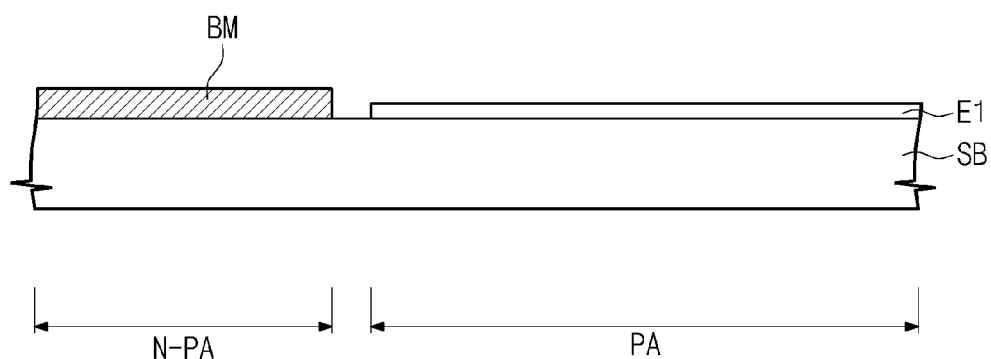
Figure 5B:
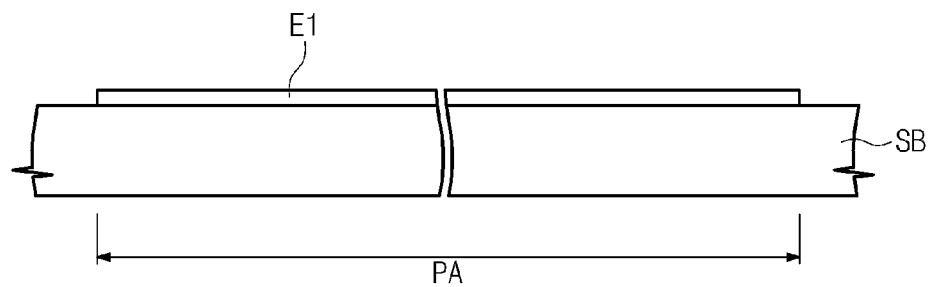

Referring to FIGS. 5A and 5B, the first electrode E1 is provided (e.g., formed) in the pixel area PA of the substrate SB and the light blocking layer BM is formed in the non-pixel area N-PA of the substrate SB. The first electrode E1 and the light blocking layer BM are formed by a deposition method, e.g., a sputtering method. The first electrode E1 is formed of the transparent conductive material and the light blocking layer BM is formed of the metal material.

Figure 6A:
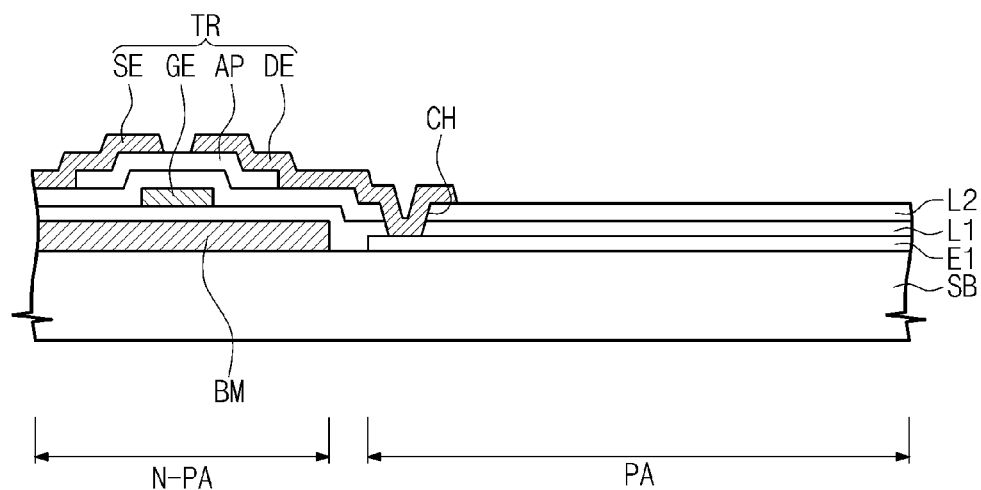
Figure 6B:
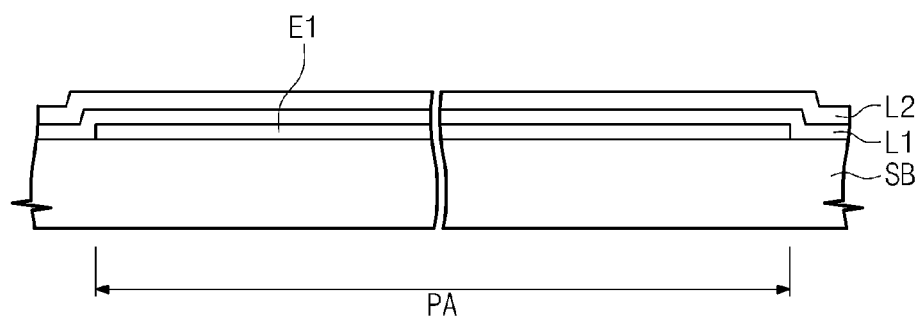

Referring to FIGS. 6A and 6B, the bottom insulating layer L1 is formed on the substrate SB to cover the light blocking layer BM and the first electrode E1, and then the thin film transistor TR is formed on the light blocking layer BM. In detail, the gate electrode GE is formed on the light blocking layer BM, the gate insulating layer L2 is formed on the gate electrode GE, and the active pattern AP is formed on the gate insulating layer L2 and overlapping the gate electrode GE. Then, the contact hole CH is defined to penetrate through cross-sectional thicknesses of the bottom insulating layer L1 and the gate insulating layer L2, to expose a portion of the first electrode E1. The source electrode SE and the drain electrode DE are formed on the active pattern AP such that the drain electrode DE makes contact with the first electrode E1 through the contact hole CH, thereby completing the thin film transistor TR.

In the illustrated exemplary embodiment, although the active pattern AP is formed by a high temperature process, since the light blocking layer BM includes the metal material, physical and/or chemical change of the light blocking layer BM due to the high temperature process may be reduced or effectively prevented. In one exemplary embodiment, for instance, even though the active pattern AP is formed by the deposition method at the temperature of about 373 degrees Celsius or crystallized by irradiating a laser beam onto the active pattern AP, the physical and chemical properties of the light blocking layer BM are not changed.

Figure 7A:
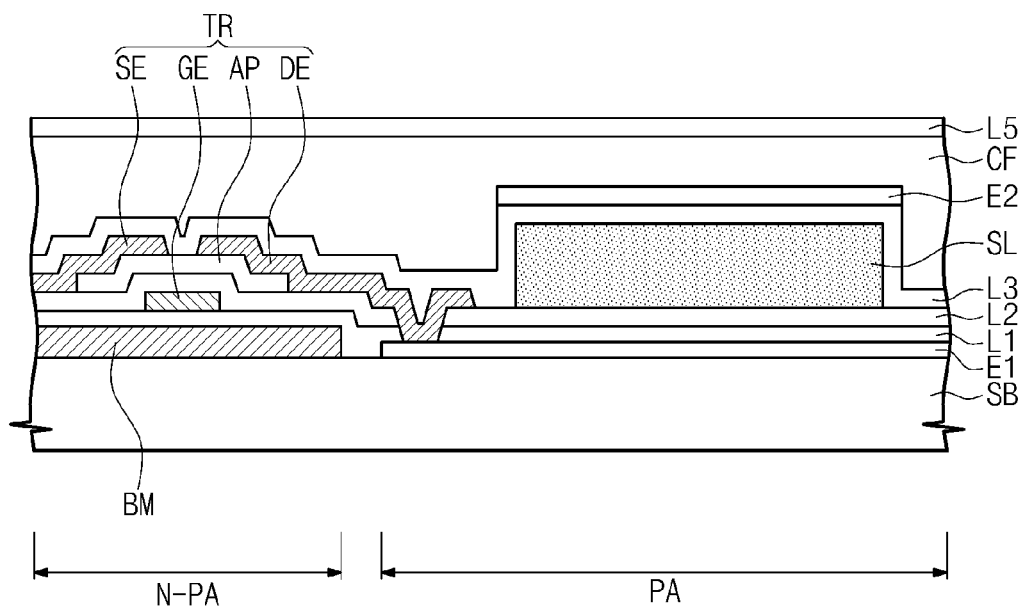
Figure 7B:
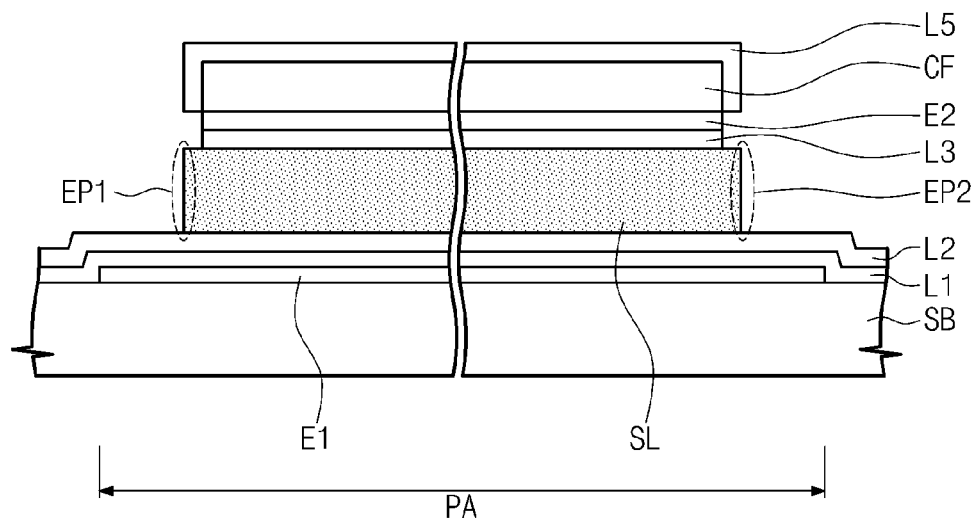

Referring to FIGS. 7A and 7B, after the thin film transistor TR is formed on the light blocking layer BM, the sacrificial layer SL is formed in the pixel area PA. The sacrificial layer SL is formed of an organic material and the cavity CV (refer to FIGS. 2A and 2B) is defined (e.g., formed) by removing the sacrificial layer SL. Therefore, the sacrificial layer SL has a size substantially corresponding to a volume of the cavity CV.

The inter-insulating layer L3 is formed to cover the thin film transistor TR and the sacrificial layer SL, the second electrode E2 is formed on the sacrificial layer SL, the color filter CF is formed on the second electrode E2, and the roof insulating layer L5 is formed on the color filter CF to cover the color filter CF. In an alternative exemplary embodiment (refer to FIGS. 2A and 2B), the roof insulating layer L5 may be omitted. As shown in FIG. 7B, the inter-insulating layer L3, the second electrode E2, the color filter CF and the roof insulating layer L5 are patterned to remove portions thereof and expose both end portions EP1 and EP2 of the sacrificial layer SL.

Figure 8A:
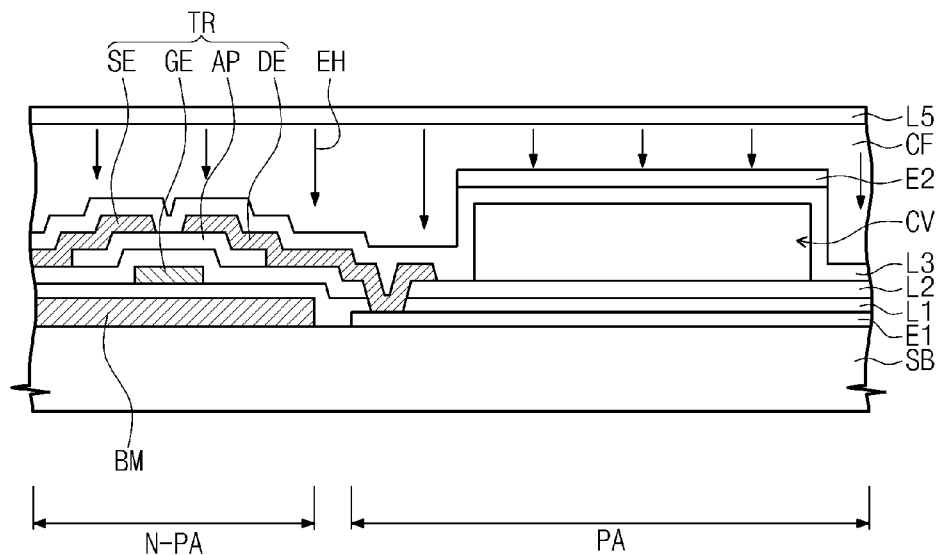
Figure 8B:
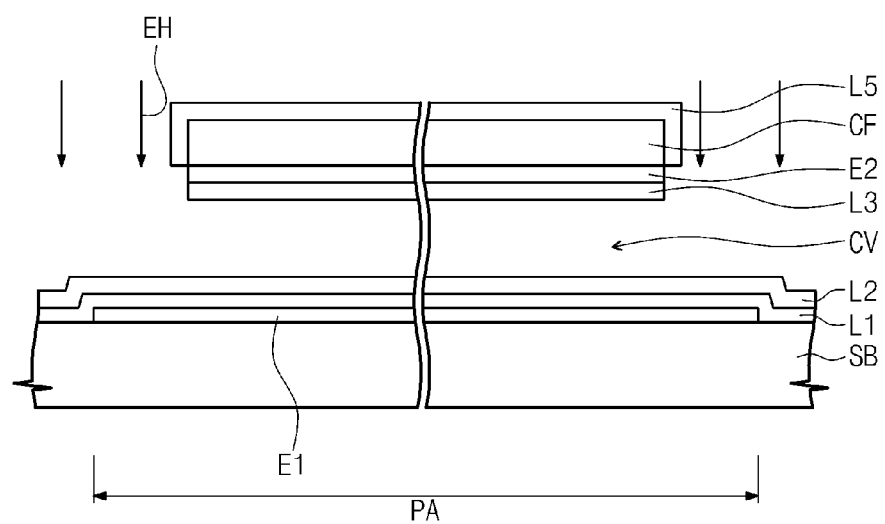

Referring to FIGS. 8A and 8B, the sacrificial layer SL (refer to FIGS. 7A and 7B) is removed using an etchant EH applied to the layered structure (refer to downward arrows).

As a result, the cavity CV is formed to correspond to the size and dimensions of the sacrificial layer SL. In the illustrated exemplary embodiment, the sacrificial layer SL is removed by an anisotropic plasma etching method. In the anisotropic plasma etching method, the sacrificial layer SL is etched from an upper surface of each of the exposed end portions EP1 and EP2, downward and to the inside thereof.

In the illustrated exemplary embodiment, each of the inter-insulating layer L3, the second electrode E2 and the roof insulating layer L5 includes the inorganic insulating material, the sacrificial layer SL includes the organic insulating material, and the etchant EH includes an etching material to selectively etch the organic insulating material sacrificial layer SL rather than the inorganic insulating material inter-insulating layer L3, second electrode E2 and roof insulating layer L5. In addition, the color filter CF includes the organic insulating material, but the color filter CF is covered by the roof insulating layer L5. Thus, etching of the color filter CF by the etchant EH while the sacrificial layer SL is etched by the etchant EH may be reduced or effectively prevented.

Figure 9A:
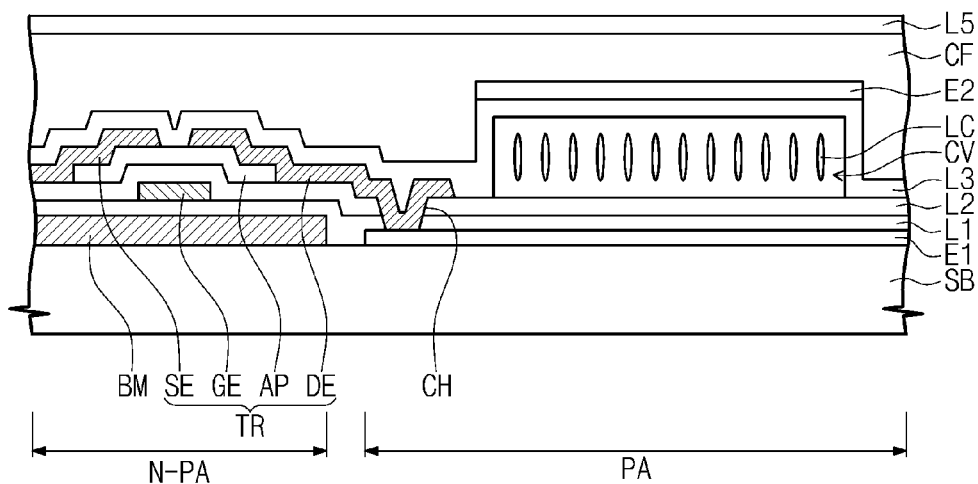
Figure 9B:
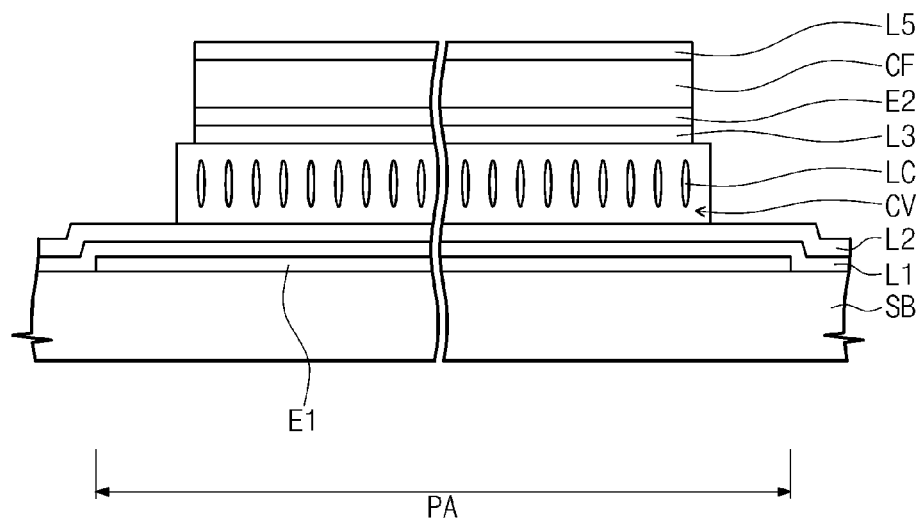

Referring to FIGS. 9A and 9B, since the first and second entrances ET1 and ET2 expose the inside of the cavity CV, the liquid crystal LC is provided inside the cavity CV through the first and/or second entrances ET1 and ET2 of the cavity CV. In more detail, when the liquid crystal LC is provided to an area or position around or adjacent to the first and second entrances ET1 and ET2, the liquid crystal LC moves into the cavity CV by a capillary tube phenomenon since the liquid crystal LC is fluid.

In an exemplary embodiment, an alignment layer (not shown) may be further formed inside the cavity CV before the liquid crystal LC is provided inside the cavity CV. In forming the alignment layer alignment solution is provided inside the cavity CV. The alignment solution is obtained by mixing polyimide which is liquid, with solvent, and the mixture is provided inside the cavity by using the capillary tube phenomenon as similarly described above relating to the liquid crystal LC. In addition, the solvent may be removed from the alignment solution using a heat treatment process after the alignment solution is provided inside the cavity CV.

Once the liquid crystal LC is provided into the cavity CV, a polymer material is provided to the multi-layered structure on the substrate SB. Then, when pressure and heat are applied to the polymer material, the polymer material is cured to form the sealing layer L4 (refer to FIGS. 2A and 2B), and thus the first and second entrances ET1 and ET2 of the cavity CV are sealed. As a result, the display substrate is manufactured.

Then, the backlight unit 50 (refer to FIG. 1) is disposed closer to the color filter CF than the substrate SB, so that the display apparatus 200 (refer to FIG. 1) or the display apparatus 201 (refer to FIGS. 3A and 3B) is respectively manufactured.

Figure 10A:
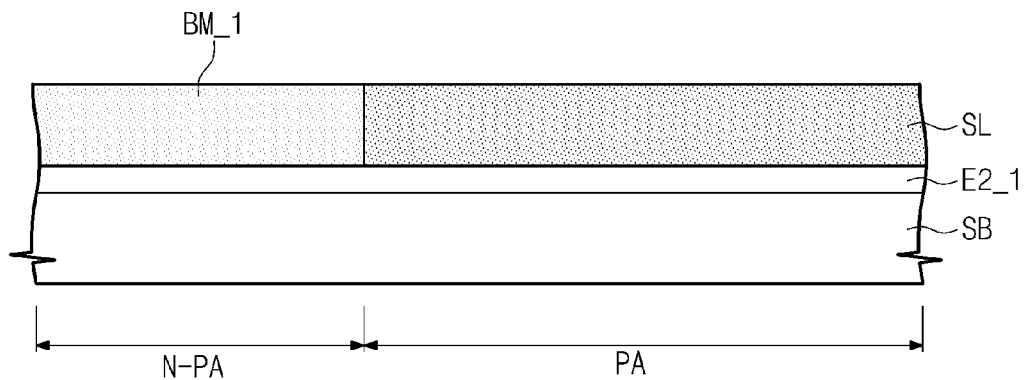
FIGS. 10A to 10C are cross-sectional views showing an exemplary embodiment of a manufacturing method of a display substrate of the display apparatus shown in FIG. 4A.
Figure 10B:
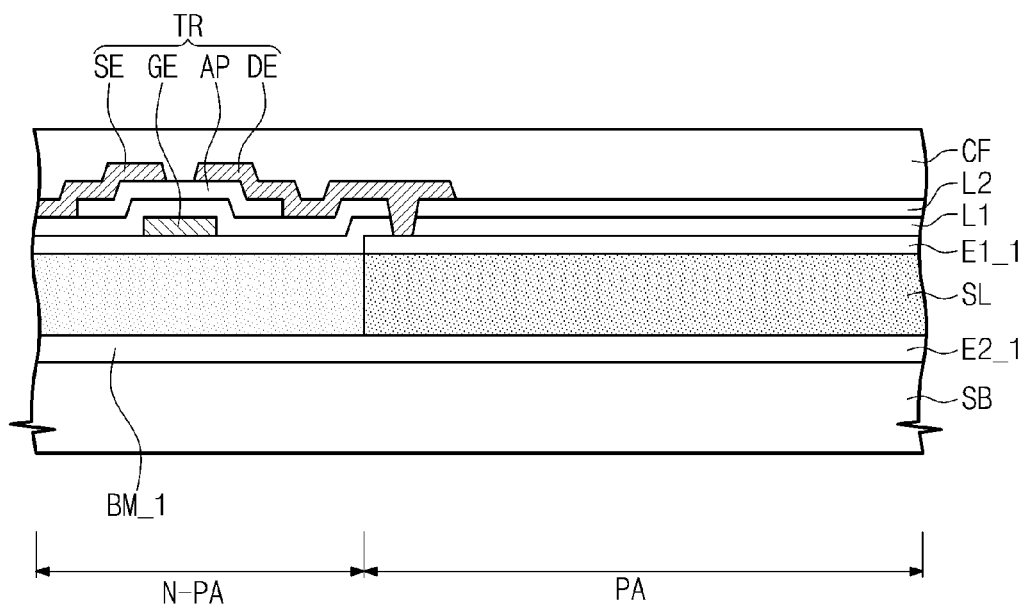
Figure 10C:
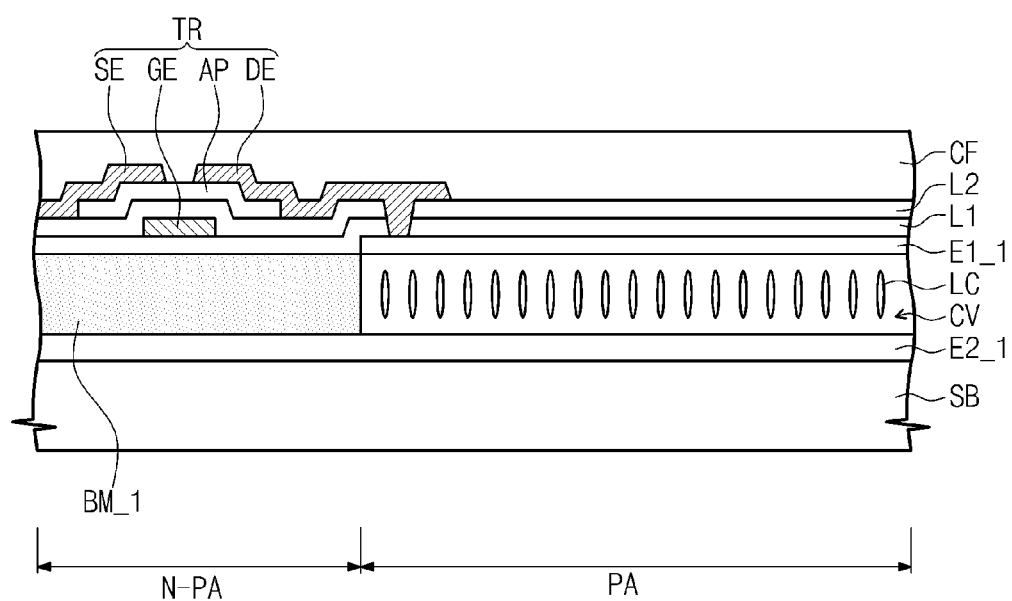

FIGS. 10A to 10C are cross-sectional views showing an exemplary embodiment of a manufacturing method of the display substrate 102 shown in the cross-section view of FIG. 4A. In FIGS. 10A to 10C, the same reference numerals denote the same elements in FIGS. 1, to 4B, and thus detailed descriptions of the same elements will be omitted.

Referring to FIG. 10A, a second electrode E2_1 is formed on the substrate SB. The second electrode E2_1 is formed over the pixel area PA and the non-pixel area N-PA.

Then, a light blocking layer BM_1 is formed in the non-pixel area N-PA. The light blocking layer BM_1 is formed of an organic material. In detail, the light blocking layer BM_1 is formed by depositing the organic material in the non-display area N-PA and performing a heat treatment process on the organic material.

A sacrificial layer SL is formed in the pixel area PA. The sacrificial layer SL is formed by depositing a source material in the pixel area PA and performing the heat treatment process on the source material.

Referring to FIG. 10B, a first electrode E1_1 is formed in the pixel area PA and a bottom insulating layer L1 is formed to cover the light blocking layer BM_1 and the sacrificial layer SL.

Then, a thin film transistor TR is formed on the light blocking layer BM_1. A drain electrode DE of the thin film transistor TR makes contact with the first electrode E1_1 through a contact hole formed penetrating through the bottom insulating layer L1 and a gate insulating layer L2.

As described above, the thin film transistor TR is formed on the substrate SB after the sacrificial layer SL and the light blocking layer BM_1 are formed on the substrate SB. Where the thin film transistor TR is formed on the substrate SB after the sacrificial layer SL and the light blocking layer BM_1, the thin film transistor TR is formed by a process performed at a temperature equal to or lower than a temperature of a curing process applied to cure the light blocking layer BM_1 and the sacrificial layer SL, and thus physical and/or chemical change of the light blocking layer BM_1 and the sacrificial layer SL due to the process applied to form the thin film transistor TR while the thin film transistor TR is formed, may be reduced or effectively prevented. In one exemplary embodiment, for instance, the light blocking layer BM_1 is cured at the temperature of about 200 degrees Celsius and the sacrificial layer SL is cured at the temperature of about 130 degrees Celsius to about 150 degrees Celsius. The thin film transistor TR is formed using the deposition method performed at the temperature of about 130 degrees Celsius to about 150 degrees Celsius.

Referring to FIG. 10C, the sacrificial layer SL is removed using the etchant EH (refer to FIGS. 8A and 8B) similar to the method described with reference to FIGS. 8A and 8B, so that the cavity CV corresponding to the size and dimensions of the sacrificial layer SL is formed.

The liquid crystal LC is provided in the cavity CV and the cavity CV is sealed by the sealing layer L4 (refer to FIG. 4A), to thereby manufacture the display substrate 102. After that, the backlight unit 50, which generates the light, is disposed closer to the color filter CF than the substrate SB to manufacture the display apparatus 202.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a backlight unit which generates a light; and
   a display substrate which receives the light and displays an image using the light,
   the display substrate comprising:
   a substrate comprising a pixel area and a non-pixel area;
   a first electrode on the substrate and in the pixel area;
   a light blocking layer on the substrate and in the non-pixel area, wherein the light blocking layer blocks the light;
   a thin film transistor on the light blocking layer, in the non-pixel area and electrically connected to the first electrode;
   a second electrode facing the first electrode, and a cavity defined therebetween;
   a liquid crystal in the cavity; and a color filter on the second electrode, wherein the color filter is closer to the backlight unit than the substrate.

2. The display apparatus of claim 1, wherein the substrate is exposed to an outside of the display substrate.

3. The display apparatus of claim 1, wherein the light blocking layer comprises a metal material.

4. The display apparatus of claim 3, wherein
a height of the cavity is greater than a thickness of the light blocking layer,
the first electrode is between the liquid crystal and the substrate, and
the second electrode is between the color filter and the liquid crystal.

5. The display apparatus of claim 4, further comprising:
a bottom insulating layer between the light blocking layer and the thin film transistor, wherein the bottom insulating layer insulates the light blocking layer from an electrode of the thin film transistor;
an inter-insulating layer between the second electrode and the liquid crystal, and covering the thin film transistor; and
a sealing layer which surrounds the cavity and seals the liquid crystal in the cavity.

6. The display apparatus of claim 1, wherein the light blocking layer comprises an organic insulating material.

7. The display apparatus of claim 6, wherein
the first electrode is between the color filter and the liquid crystal, and
the second electrode is between the liquid crystal and the substrate.

8. The display apparatus of claim 7, wherein the second electrode is in the pixel area and the non-pixel area.

9. The display apparatus of claim 7, further comprising:
a bottom insulating layer between the light blocking layer and the thin film transistor and on the first electrode,
a contact hole defined in the bottom insulating layer to expose a portion of the first electrode, wherein the first electrode contacts an electrode of the thin film transistor through the contact hole; and
a sealing layer which surrounds the cavity and seals the liquid crystal in the cavity.

10. The display apparatus of claim 1, further comprising a roof insulating layer comprising an inorganic insulating material and covering the color filter.

11. A method of manufacturing a display apparatus, comprising:
preparing a substrate comprising a pixel area and a non-pixel area;
providing a first electrode in the pixel area;
providing a light blocking layer in the non-pixel area;
providing a thin film transistor on the light blocking layer and electrically connected to the first electrode;
providing a sacrificial layer on the first electrode;
providing a second electrode on the sacrificial layer;
providing a color filter on the second electrode;
removing the sacrificial layer to define a cavity between the first electrode and the second electrode;
providing a liquid crystal in the cavity;
sealing the liquid crystal in the cavity using a sealing layer to manufacture a display substrate of the display apparatus; and
disposing a backlight unit which generates a light closer to the color filter of the display substrate than the substrate of the display substrate.

12. The method of claim 11, wherein the backlight unit exposes the substrate of the display substrate to an outside of the display substrate.

13. The method of claim 11, wherein the light blocking layer comprises a metal material.

14. The method of claim 13, wherein
a height of the cavity is greater than a thickness of the light blocking layer,
the first electrode is between the liquid crystal and the substrate, and
the second electrode is between the color filter and the liquid crystal.

15. The method of claim 14, further comprising:
providing a bottom insulating layer between the light blocking layer and the thin film transistor, to insulate the light blocking layer from an electrode of the thin film transistor; and
providing an inter-insulating layer between the second electrode and the liquid crystal to cover the thin film transistor.

16. The method of claim 11, wherein the light blocking layer comprises an organic insulating material.

17. The method of claim 16, wherein
the first electrode is between the color filter and the liquid crystal, and
the second electrode is between the liquid crystal and the substrate.

18. The method of claim 17, wherein the second electrode is in the pixel area and the non-pixel area.

19. The method of claim 17, wherein
the providing the sacrificial layer and the light blocking layer comprises curing the sacrificial layer and the light blocking layer, by a process at a temperature, and
the thin film transistor is provided on the substrate after the sacrificial layer and the light blocking layer are provided, by a process at a temperature which is equal to or lower than the temperature at which the sacrificial layer and the light blocking layer are cured.

20. The method of claim 11, further comprising providing a roof insulating layer on the color filter, the roof insulating layer comprising an inorganic insulating material.

* * * * *